United States Patent
Vigholm et al.

(10) Patent No.: US 7,287,374 B2
(45) Date of Patent: Oct. 30, 2007

(54) SYSTEM AND METHOD FOR CONTROLLING VISCOSITY OF A FLUID AND A WORKING VEHICLE CONTAINING SUCH A SYSTEM

(75) Inventors: Bo Vigholm, Stora Sundby (SE); Lennart Strandberg, Falun (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/163,182

(22) Filed: Oct. 7, 2005

(65) Prior Publication Data

US 2006/0021340 A1   Feb. 2, 2006

Related U.S. Application Data

(63) Continuation of application No. PCT/SE2004/000484, filed on Mar. 30, 2004.

(30) Foreign Application Priority Data

Apr. 15, 2003  (SE)  .................................... 0301136

(51) Int. Cl.
*F16D 31/02* (2006.01)
(52) U.S. Cl. ..................................... 60/329
(58) Field of Classification Search ............... 91/431, 91/419; 60/329
See application file for complete search history.

(56) References Cited

U.S. PATENT DOCUMENTS

| | | | |
|---|---|---|---|
| 4,249,641 A | | 2/1981 | Takenoshita et al. |
| 4,354,517 A | | 10/1982 | Zirps |
| 4,373,869 A | * | 2/1983 | Martin et al. .................. 60/329 |
| 4,798,050 A | * | 1/1989 | Nakamura et al. ............. 60/329 |
| 5,118,259 A | | 6/1992 | Bishoff |
| 5,215,444 A | * | 6/1993 | Bishoff ......................... 60/329 |

FOREIGN PATENT DOCUMENTS

GB    1024503    3/1966

* cited by examiner

*Primary Examiner*—F. Daniel Lopez
(74) *Attorney, Agent, or Firm*—WRB-IP, LLP (57) ABSTRACT

The invention relates to a method and system for controlling viscosity of a hydraulic fluid. The viscosity of a hydraulic fluid is usually very much dependent on temperature. By using existing throttles which generate a pressure drop, the hydraulic fluid can be heated by creating a power drain in these existing throttles through a controlled increase of the pressure through them. By controlled heating, the viscosity of a hydraulic fluid can be controlled. According to the invention, the existing throttles are preferably cavity-preventing openings in valves.

26 Claims, 5 Drawing Sheets

SYSTEM AND METHOD FOR CONTROLLING VISCOSITY OF A FLUID AND A WORKING VEHICLE CONTAINING SUCH A SYSTEM

BACKGROUND AND SUMMARY

The present invention is a continuation of PCT/SE2004/000484, filed Mar. 30, 2004, which claims priority to SE 0301136-8, filed Apr. 15, 2003, both of which are hereby incorporated by reference.

The present invention relates to a system and a method for controlling viscosity of a fluid, in particular hydraulic fluid such as hydraulic oil. The method and the system are especially suitable for application in hydraulic systems of heavy vehicles such as loaders and snow-clearing equipment.

Viscosity is one of the most important properties of a hydraulic fluid, especially in a hydraulic operating system. Viscosity is a value of the fluid's flow resistance, or, in other words, the inertia with which the fluid moves. When the viscosity is low, the fluid is thin and free-flowing. Conversely, when the viscosity is high, the fluid is then thick and sluggish.

High viscosity of a hydraulic fluid results in a hydraulic system which is sluggish and can lead to excessive loading of pumps, for example. On the other hand, a viscosity which is too low results in greater risk of leakage in seals and in development of friction-reducing films of oil.

Hydraulic fluid such as oil becomes thicker and acquires higher viscosity when its temperature drops, and becomes thinner, acquiring a lower viscosity, when its temperature rises. That is to say that changes in temperature can have a dramatic effect on viscosity and, consequently, on the functioning of components in the hydraulic system.

In particular, recent environmentally refined hydraulic fluids have been found to have unfavorable properties at low temperatures. A hydraulic fluid at its optimal temperature usually has, in addition to a suitable viscosity, positive properties such as efficient release of air and a desirably high level of incompressibility.

Changes in the temperature of the hydraulic fluid which affect operation of the hydraulic system can be caused by the surrounding environment, such as weather and wind, and by heat generated internally in the system, for example by a pressure drop in valves.

The invention will be described below in connection with working equipment in the form of a wheel-mounted loader. This is a preferred but in no way limiting application of the invention. The invention can for example also be used on other types of operating equipment, such as frame-steered dumpers and excavators.

Historically, hydraulic systems on conventional loaders have been constructed with a continuous pumping circulation, even when the hydraulics are not in use.

Modern machines are often constructed with load-sensing hydraulic systems and then expediently use pumps with variable displacement. In load-sensing systems, there is no pump circulation if the hydraulics are not in use, which means that there is no continuous heating of the hydraulic fluid. In addition, load-sensing hydraulic systems usually have less power dissipation, that is to say these systems generate less heating on account of less dissipation. This is excellent in a hot climate, since the need for cooling is reduced or disappears. However, for example in the case of snow clearing and snow ploughing of roads, the engine has to operate while the working hydraulics are relatively inactive. For example, in the loading and unloading of lorries too, there may be idle times between vehicles with relatively little use of the operating hydraulics.

This means that the surrounding environment will effectively cool the hydraulic fluid, since there is no or very little self-heating for counteracting cooling by the environment. There is then a great risk of complications arising on account of the hydraulic fluid having an unfavourable, excessively high viscosity caused by too low a temperature of the hydraulic fluid.

It is desirable to eliminate the abovementioned disadvantages.

It is desirable to define a method and a system for controlling the viscosity of a hydraulic fluid.

It is desirable to be able to increase the working temperature of a hydraulic fluid in a load-sensing hydraulic system.

Aspects of the present invention relate to a method and system for controlling the viscosity of hydraulic fluid. The viscosity of a hydraulic fluid is usually very much dependent on temperature. By using existing throttles which generate a pressure drop, the hydraulic fluid can be heated by creating a power drain in these existing throttles through a controlled increase of the pressure through them. By controlled heating, the viscosity of a hydraulic fluid can be regulated. According to the invention, the existing throttles are preferably cavitation-preventing openings in valves.

An aspect of the present invention relates to a method for controlling the viscosity of a hydraulic fluid. The hydraulic fluid is included at least in part in a hydraulic circuit. The hydraulic circuit comprises a pump, a first load, and a valve for coupling the first load to the pump and for uncoupling the first load from the pump.

In the uncoupled position, the valve comprises an existing cavitation-preventing opening to the load. That is to say that when the load is uncoupled from the pump with the aid of the valve, there is then a cavitation preventing opening between the pump and the load. The cavitation-preventing opening has a considerably smaller cross-sectional area than the opening of the valve which couples the load to the pump. Although the term "uncoupled" is used, there is therefore still a small flow connection between the pump and the load when the valve is set in the uncoupled position.

According to an aspect of the invention, the method controls the viscosity of the hydraulic fluid by, when necessary, increasing the temperature of the hydraulic fluid via a number of steps. In a first step, the temperature of the hydraulic fluid is determined. In a second step, the valve status is determined, that is to say in which position the valve is located. In a third step, the pressure of the hydraulic circuit is increased in the case where the valve status is such that the first load is uncoupled and the temperature of the hydraulic fluid is lower than a predetermined temperature. In order to increase the pressure, the pump is controlled so that it delivers an increased flow. This creates a temperature-increasing pressure drop in the cavitation preventing opening in the valve. The pump thus pumps hydraulic fluid through the opening, where a pressure drop occurs, and thus a power drain occurs which results in an increase in the temperature of the hydraulic fluid.

The pressure is expediently increased until a predetermined pressure is obtained in the hydraulic circuit, or until a pressure is obtained which is a function of the difference between the predetermined temperature and the temperature of the hydraulic fluid in such a way that the greater the temperature difference, the higher the pressure, or until a predetermined power drain is obtained as heating of the hydraulic fluid via the pressure drop in the cavitation preventing opening. The predetermined pressure can thus either be measured directly via pressure sensors or calculated on the basis of other measurable parameters.

In certain cases it is expedient that the increased pressure is maintained only for a predetermined length of time. In other cases, it is expedient that the increased pressure is maintained for a length of time until the difference between the predetermined temperature and the temperature of the hydraulic fluid is less than or equal to a predetermined value.

In certain applications, the viscosity control has a lower priority than the first load, which means that the viscosity control according to the method is interrupted when there is a need to obtain a power drain in the first load. In other applications, the step of determining the valve status also comprises a subsidiary step after the determination of the valve status, namely, in the case where the valve status is such that the first load is coupled in and the temperature of the hydraulic fluid is lower than a predetermined temperature, the first load is uncoupled and a new determination of the valve status is made, which means that the viscosity control has a higher priority than the first load.

In certain applications, the method can expediently comprise two further steps after the determination of the valve status. In the case where the valve status is such that the first load is coupled in and the temperature of the hydraulic fluid is lower than a predetermined temperature, a first further step determines whether the power drain of the first load or an acceptable lesser power drain can be taken from the flow which is obtained from the cavitation-reducing opening in combination with a higher pressure in the hydraulic circuit. If it is determined that the power drain of the first load or an acceptable lesser power drain can be taken, a second further step uncouples the first load and the pressure in the hydraulic circuit is increased to the necessary value so that the first load can take its power drain or an acceptable lesser power drain in combination with the pressure drop creating heating of the hydraulic fluid.

In certain applications, the hydraulic circuit comprises a second load which has extra high priority and is of short duration. When the second load is coupled in, the pressure in the hydraulic circuit is increased to a predetermined value and the first load is uncoupled, all of this during a length of time which is of the order of a power of ten shorter than the shortest length of time during which an increased pressure exists in the hydraulic circuit for viscosity control.

The hydraulic circuit is sometimes an auxiliary circuit and the first load is a fan. The pump is preferably a controllable load-sensing pump with variable displacement.

The above-described method steps according to the invention can be combined randomly to give a procedure, as long as there are no conflicts between the method steps.

An aspect of the invention relates to a viscosity-controlling system for controlling the viscosity of a hydraulic fluid. The system comprises a hydraulic circuit having a pump, a first load, and a valve for coupling the first load to the pump and for uncoupling the first load from the pump. The hydraulic fluid is included at least in part in the hydraulic circuit. In the uncoupled position, the valve comprises an existing cavitation-preventing opening to the load. The system additionally comprises a control unit which controls the valve and the pump.

According to an aspect of the invention, the system is designed to control the viscosity of the hydraulic fluid by, when necessary, increasing the temperature of the hydraulic fluid. This is achieved by the control unit being designed to determine the temperature of the hydraulic fluid and the valve status and on this basis the control unit is designed to increase the pressure of the hydraulic circuit by controlling the pump in the case where the valve status is such that the first load is uncoupled and the temperature of the hydraulic fluid is lower than a predetermined temperature. This creates a temperature-increasing pressure drop in the cavitation preventing opening in the valve.

The control unit is expediently designed to control the pump so that the pressure is increased until a predetermined pressure is obtained in the hydraulic circuit, or to control the pump so that the pressure is increased until a pressure is obtained which is a function of the difference between the predetermined temperature and the temperature of the hydraulic fluid in such a way that the greater the temperature difference, the higher the pressure, or to control the pump so that the pressure is increased until a predetermined power drain is obtained as heating of the hydraulic fluid via the pressure drop in the cavitation preventing opening.

In certain embodiments, it may be expedient for the control unit to be designed to control the pump so that the increased pressure is maintained only for a predetermined length of time. In other embodiments, it may be expedient for the control unit to be designed to control the pump in such a way that the increased pressure is maintained for a length of time until the difference between the predetermined temperature and the temperature of the hydraulic fluid is less than or equal to a predetermined value.

It is sometimes expedient for the viscosity control to have a lower priority than the first load, which means that the control unit is designed to interrupt the viscosity control when there is a need to obtain a power drain in the first load. It is sometimes expedient for the control unit to be designed, in conjunction with the determination of the valve status, and in the case where the valve status is such that the first load is coupled in and the temperature of the hydraulic fluid is lower than a predetermined temperature, to uncouple the first load and determine the valve status again, which means that the viscosity control has a higher priority than the first load.

In some embodiments, in the case where the valve status is such that the first load is coupled in and the temperature of the hydraulic fluid is lower than a predetermined temperature, the control unit is designed to determine whether the power drain of the first load or an acceptable lesser power drain can be taken from the flow which is obtained from the cavitation-reducing opening in combination with a higher pressure in the hydraulic circuit, and, if it is determined that the power drain of the first load or an acceptable lesser power drain can be taken, it is designed to uncouple the first load and increase the pressure in the hydraulic circuit to the necessary value so that the first load can take its power drain or an acceptable lesser power drain in combination with the pressure drop creating heating of the hydraulic fluid.

The system can be constructed such that the hydraulic circuit comprises a second load which has extra high priority and is of short duration. In this case, the control unit is expediently designed, upon coupling of the second load, to control the pump such that the pressure in the hydraulic circuit increases to a predetermined value and to uncouple the first load. The second load is coupled-in in this way for a length of time which is of the order of a power of ten shorter than the shortest length of time during which the control unit is designed to maintain a pressure increase in the hydraulic circuit for viscosity control.

The system can sometimes be part of a slightly larger hydraulic system and, in this case, the hydraulic circuit can, for example, be an auxiliary circuit. The first load can, for example, be a fan for cooling an engine in a vehicle. The pump can expediently be a controllable load-sensing pump with variable displacement.

The above-described features can be randomly combined to construct a system according to the invention, on condition that there are no conflicts between features.

A great advantage of an aspect of the invention is that an existing installation can be used, as long as there is a cavitation preventing opening. The only thing which is usually needed is a change in the control of the hydraulic system. A temperature sensor is usually present. This means it is incredibly simple to upgrade an already existing system. If it is a system in which the valve with cavitation-preventing opening belongs to a cooling fan for the engine, which cooling fan is controlled by the temperature of the engine's cooling water, then the likelihood of a usage conflict is small. This is because the cooling requirement of the engine in a cold climate/environment is minimal, while at the same time heating of the hydraulic fluid is probably necessary.

The opposite applies in a hot climate/environment where the engine requires a lot of cooling, whereas the hydraulic circuit probably does not require any heating.

BRIEF DESCRIPTION OF THE FIGURES

The invention will be described in more detail below with reference to the embodiments shown on the attached drawings, in which.

DETAILED DESCRIPTION

Machinery with hydraulic systems requires a certain viscosity of the hydraulic fluid in order to function satisfactorily. The temperature is the single most important factor affecting the viscosity of the hydraulic fluid. The viscosity-controlling method according to the invention is thus designed so that the hydraulic fluid can reach an operating temperature which results in the hydraulic fluid having a desired viscosity. Problems arise in most cases with machinery operating in cold climates, for example snow-clearers. It may also unfortunately happen that the operating hydraulics are seldom used or used only sporadically, which has the result that there is no self-heating of the hydraulic fluid in the hydraulic system. Self heating of the hydraulic fluid to a large extent arises through a pressure drop, which results in a power drain, on the one hand as mechanical work and on the other hand as heat. The part resulting in heat, which affords self-heating, are dissipations in the system and these have been reduced over the years following improvements in hydraulic systems. Some of the improvements have been achieved through use of better components, others through using on-demand controls of pumps and the like, that is to say if there is no user, there is no reason to deliver power. Nor is it desirable to have a hydraulic system in which the dissipation, the self-heating, is so great that one or more hydraulic fluid coolers have to be installed in the system in order to keep the temperature down and thus maintain the correct viscosity. Such a system could perhaps be tailored to function in a cold climate, but not when it becomes warmer.

Modern hydraulic systems thus have low dissipation, that is to say have a low degree of self-heating, and can therefore have problems in cold weather. The invention is based on using an existing hydraulic system and, if necessary, creating considerable dissipation through changing the control of the hydraulic system in order to thereby produce an artificial and therefore controllable self-heating.

According to the invention, an existing hydraulic system is thus used in which the hydraulics are not changed in any way, that is to say no modifications are made to existing components, no new hydraulic components are added, and nothing is removed either from the hydraulics. The invention uses existing throttles in the hydraulic system and ensures that there are substantial and long-lasting pressure drops in these throttles so that sufficient power drain can be obtained, that is to say it is possible to create sufficiently great heat losses when needed for heating the hydraulic fluid. Cavitation-preventing openings are preferably used. Cavitation-preventing openings are throttles intended for example to provide rotating fans with a small amount of hydraulic fluid after uncoupling, since otherwise the continued fan rotation would create cavitation formation, foam formation and the like on account of abrupt uncoupling. According to the invention, valves are thus arranged so that cavitation preventing openings are accessible and control pumps so that a pressure increase arises at these accessible openings. This pressure increase thus corresponds to a power drain in the pressure drop through the throttle, the cavitation-preventing opening or openings.

Figure 1:
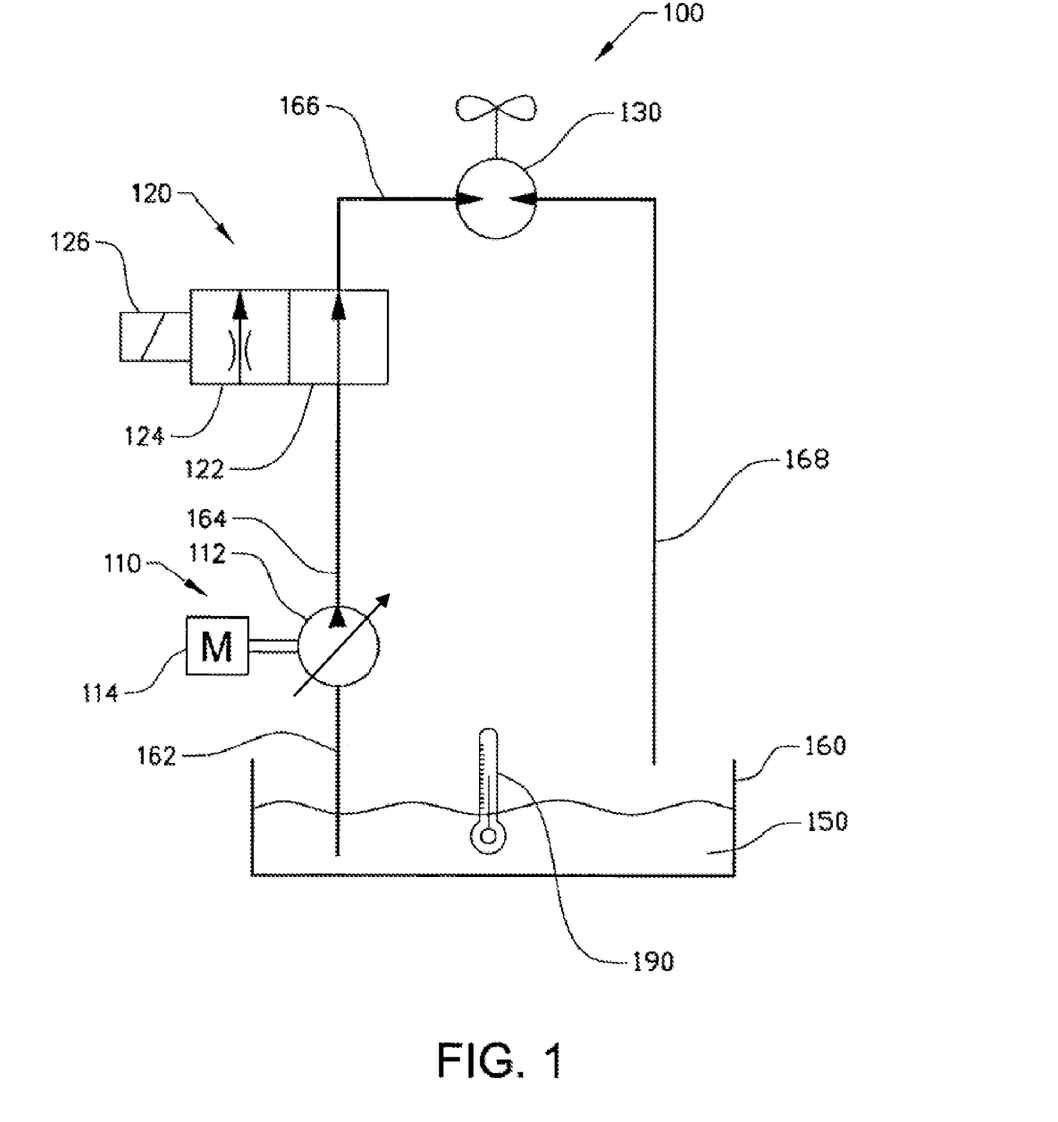
FIG. 1 shows a basic hydraulic system to which the invention can expediently be applied.

FIG. 1 shows a basic hydraulic system with a single hydraulic circuit 100 on which the invention can expediently be used. The hydraulic circuit comprises a load 130, for example a fan, which is driven with hydraulic fluid 150, usually from a tank/reservoir 160.

A hydraulic pump system 110 comprising of a pump 112 driven by a motor 14 creates a working pressure by pumping hydraulic fluid 150 from the tank 160 via a valve 120 to the load 130 and back again to the tank 160, all this with the aid of interconnected hydraulic fluid lines 162,164,166,168. The valve 120, comprising a cavitation-preventing opening in its closed position 124, is controlled 126 in synchrony with the pump system 110 so that when there is a need for a power drain in the load 130, for example because a motor starts to heat up and needs cooling by fan, the valve is switched to the open position 122 an the pump system 110 generates an operating pressure. When the requirement ceases, that is to say when the motor has been sufficiently cooled, the pump system 110 is closed off or drops to a minimum operating level/pressure and the valve is switched to the closed position 124 and now provides the load only with a minimal amount of hydraulic fluid through a throttle a cavitation-preventing opening, in order to prevent cavitation formation due to the load, for example, still rotating.

According to the invention, the viscosity is controlled by managing the temperature of the hydraulic fluid. The temperature of the hydraulic fluid is measured anywhere in the system, usually in the tank 160, with the aid of a thermometer 190. Normally, one wants at least to check that the hydraulic fluid 150 is not getting too warm. This can be a warning signal indicating that something is seriously wrong in the hydraulic system.

According to the invention, the temperature of the hydraulic fluid is expediently determined first. Is it too low?

If it is too low, the position 122,124 of the valve 120 is checked. If the load is coupled in 122, then one either waits until the valve 120 changes position, or one forces the valve 120 to uncouple 124 the load 130. If one waits, the load has a higher priority 124 than the viscosity control; if a change is forced, the viscosity control then has a higher priority. The order of priority can of course depend on how urgent is the requirement of the load in relation to how urgent is the viscosity control, and vice versa.

When the valve 120 has uncoupled 124 the load 130, the pump 110 is controlled so that it generates a high operating pressure and so that a pressure drop is obtained in the cavitation-preventing opening. For example, if narrowing takes place from 15 mm to 1.5 mm and the pump is controlled to 210 bar, a power drain of 4.9 kW can be obtained in order to heat the hydraulic fluid.

This expediently takes place either at fixed time intervals of the order of minutes and/or together with temperature-monitoring. If appropriate, the flow created from the throttle may be enough for the load, in which case the two functions can be combined.

Figure 2:
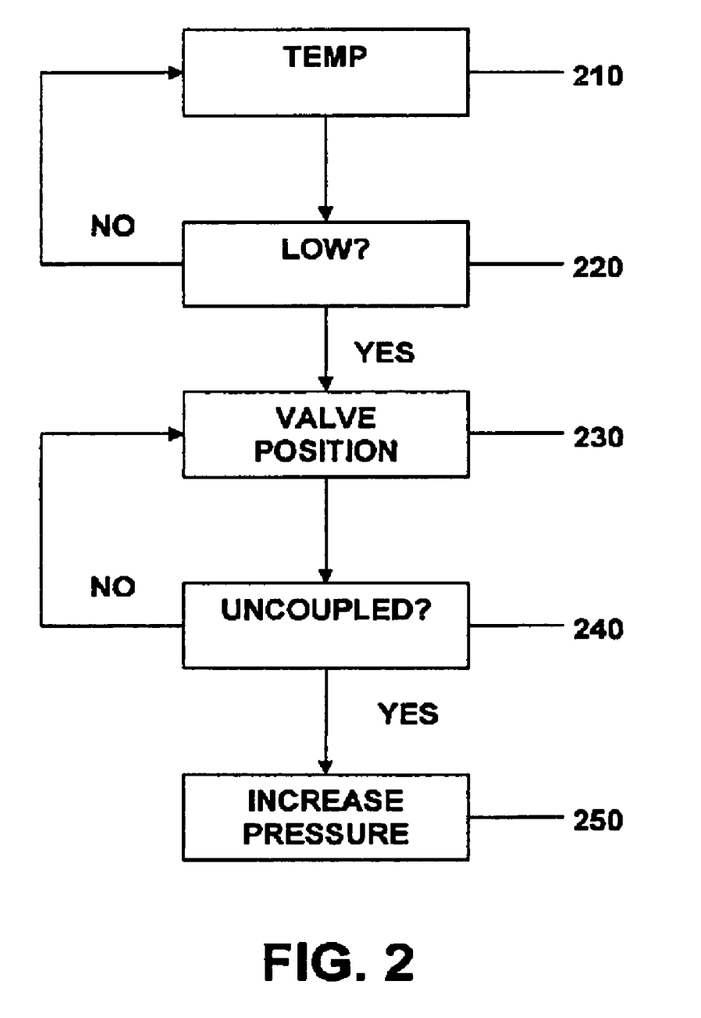
FIG. 2 shows a basic method according to the invention to be applied, for example, to a hydraulic system according to FIG. 1.

FIG. 2 shows a basic method according to the invention, to be applied for example on a hydraulic system according to FIG. 1. In a first step 210, either from another procedure, the end of the procedure or from a second step 220 if the temperature of the hydraulic fluid is not too low, the temperature of the hydraulic fluid is measured. In the second step 220, from the first step 210, it is determined whether the temperature of the hydraulic fluid is too low or not.

According to the invention, the viscosity is controlled with the aid of the temperature of the hydraulic fluid.

A major problem is of course, as has been discussed, that the temperature is often too low. A third step 230, from the second step 220 if it was determined that the temperature of the hydraulic fluid is too low, or from a fourth step 240 if the valve is in a position in which the load is coupled in, determines what the position of the valve is. Is the valve open, that is to say a load coupled in, or is the valve closed, that is to say the load uncoupled? This information is usually present in a control register or an output of a control unit. The fourth step 240, from the third step 230, determines whether the load is coupled in or uncoupled.

In a fifth step 250, from the fourth step 240 if the load is uncoupled, the pressure in the hydraulic circuit is increased so as to create, through the existing cavitation-preventing opening in the valve, a pressure drop and thereby obtain a power drain which heats the hydraulic fluid. This pressure increase can have a defined duration, or its duration can be tailored to requirements. A pressure increase tailored to requirements can be ended when the hydraulic fluid is sufficiently hot or when the load requires power.

Figure 3:
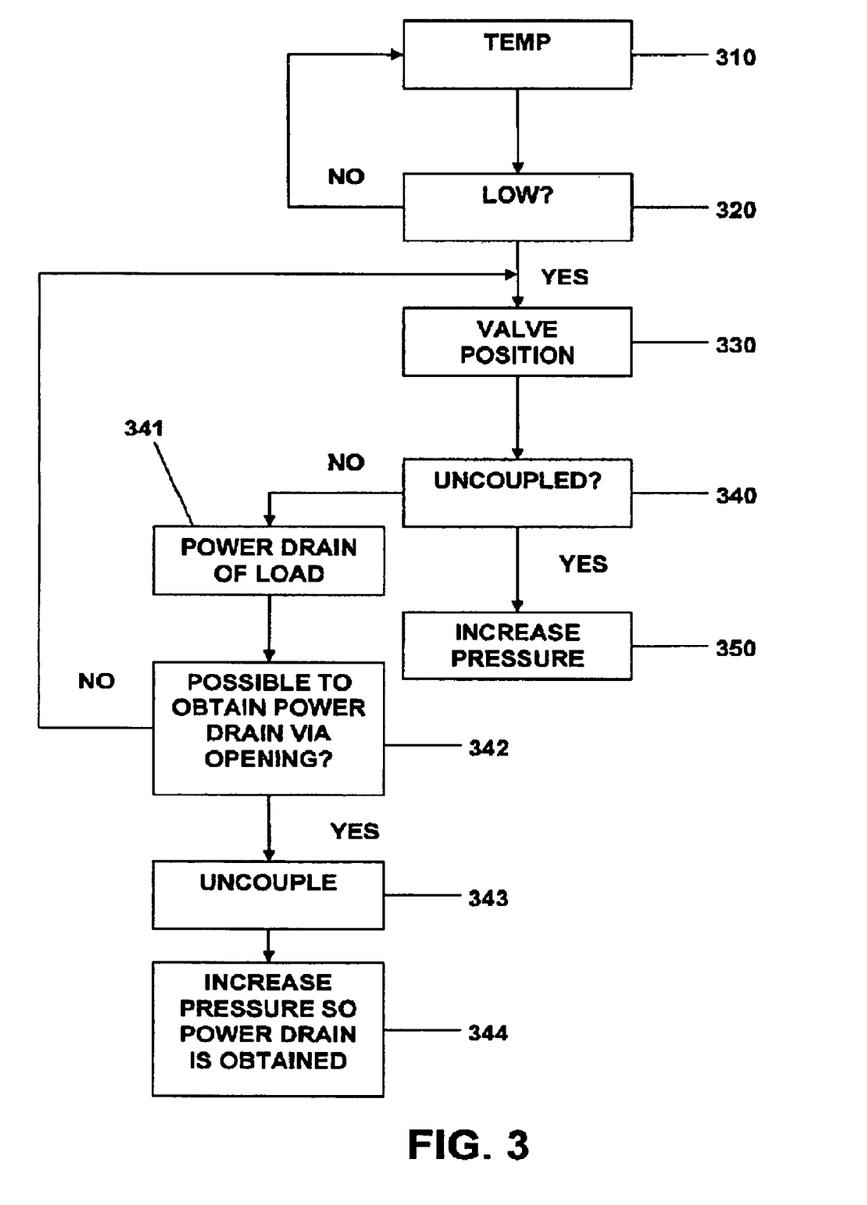
FIG. 3 shows an extended method according to the invention.

FIG. 3 shows an extended method according to the invention in which certain steps are identical to those described above. A first step 130 involves measuring the temperature of the hydraulic fluid. A second step 320 determines whether the temperature of the hydraulic fluid is too low or not. The third step 330 is also from a second extra step 342 if a desired power drain of the load is not possible via the cavitation-preventing opening. The third step 330 determines/establishes what the position of the valve is. The fourth step 340 determines if the load is coupled or uncoupled, based on the valve position. A first extra step 341, from the fourth step 340 if the valve is in a position in which the load is coupled, determines/establishes the desired power drain of the load. The second extra step 342, from the first extra step 341, determines whether an increased pressure can generate the desired power drain of the load or whether a lesser but still acceptable power drain for the load by increasing the pressure and thereby the flow thus obtained through the cavitation-preventing opening. A third extra step 343, from the second extra step 342 if the load's desired power drain or a lesser but still acceptable power drain for the load can be obtained through increasing the pressure and the thus resulting flow through the cavitation-preventing opening, controls the valve so that the load is uncoupled, and the cavitation-preventing opening is coupled in between the pump and the load. From the third extra step 343, there is a fourth extra step 344 in which the pressure in the hydraulic circuit is increased so that the load's desired power drain or acceptable power drain is obtained, this at the same time creating a pressure drop and thereby generating a power drain which heats the hydraulic fluid. A fifth step 350, from the fourth step 340 if the load is uncoupled, similar to the previously described fifth step, increases the pressure in the hydraulic circuit in order thereby to create, through the existing cavitation-preventing opening in the valve, a pressure drop and thus generate a power drain which heats the hydraulic fluid.

The method steps in the above-described methods do not have to be performed in accordance with the examples given, but simply in such an order that steps which need results from other steps are carried out only after these other steps have been carried out. Otherwise, the steps can be carried out in any order or in some cases in parallel.

Figure 4:
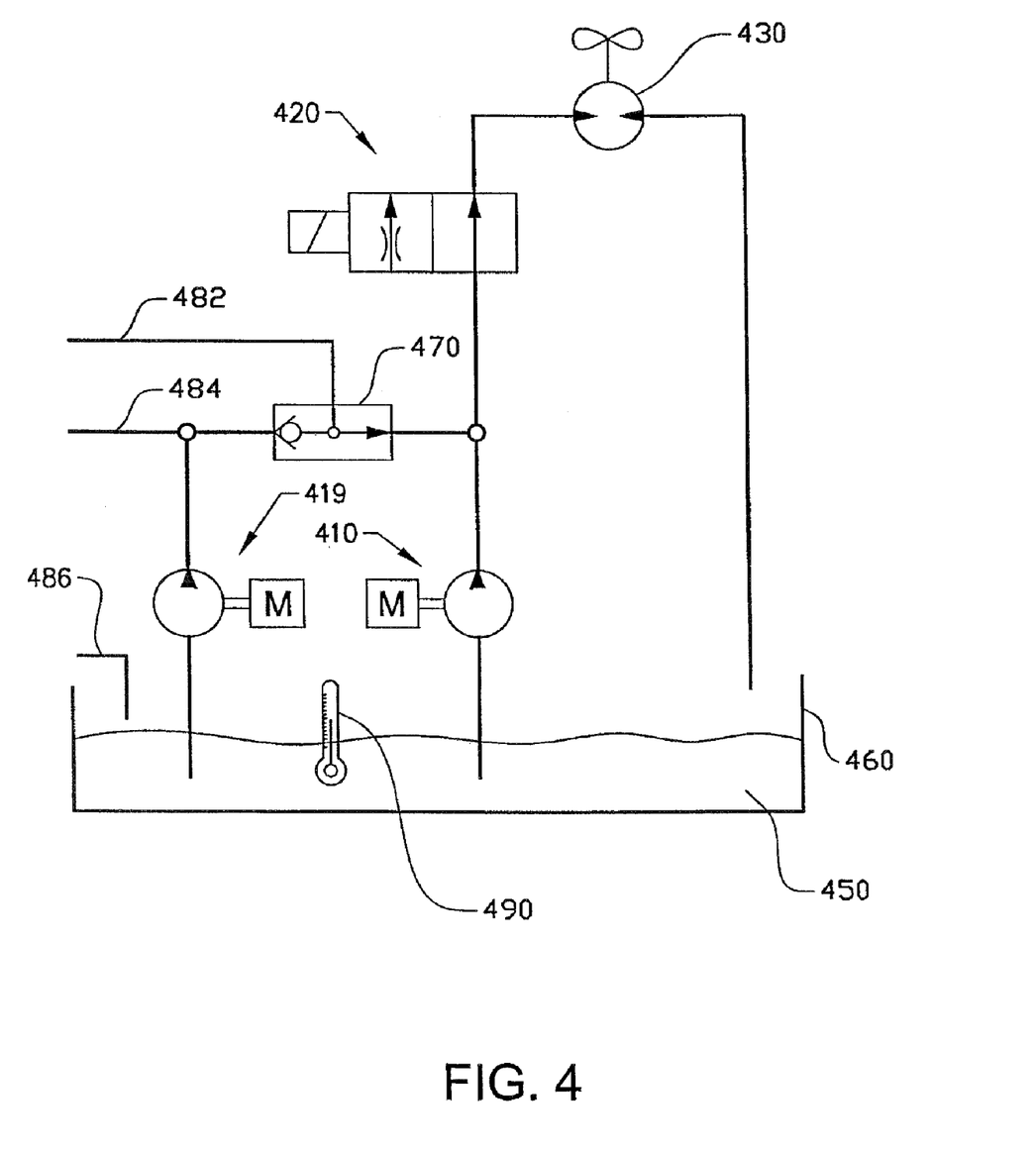
FIG. 4 shows a typical hydraulic system with main circuit and auxiliary circuit to which the invention can expediently be applied.

Finally, FIG. 4 shows a typical hydraulic system with main circuit and auxiliary circuit on which the invention can expediently be applied. There are great similarities with the system described in relation to FIG. 1, where the system is essentially an auxiliary circuit in the main system according to FIG. 4. The auxiliary circuit comprises a pump 410, a valve 420 for controlling a load 430. The only parts of the main circuit shown are a pump 419, a pressure controlled valve 470, supply line 484 to the operating hydraulics, supply return line 486 from the operating hydraulics, and a supply line 482 to a high-priority load, for example brake load. The system has a number of components in common, among them the hydraulic circuit 450, the tank 460 for the hydraulic fluid, and the thermometer 490. This means that the heating of the hydraulic fluid in the auxiliary circuit benefits the entire system.

The auxiliary system is controlled as in FIG. 1, except that the high-priority load forces the load 430 of the auxiliary circuit to be uncoupled momentarily, for the order of 1 second, in order to feed 482 the high-priority load.

Figure 5:
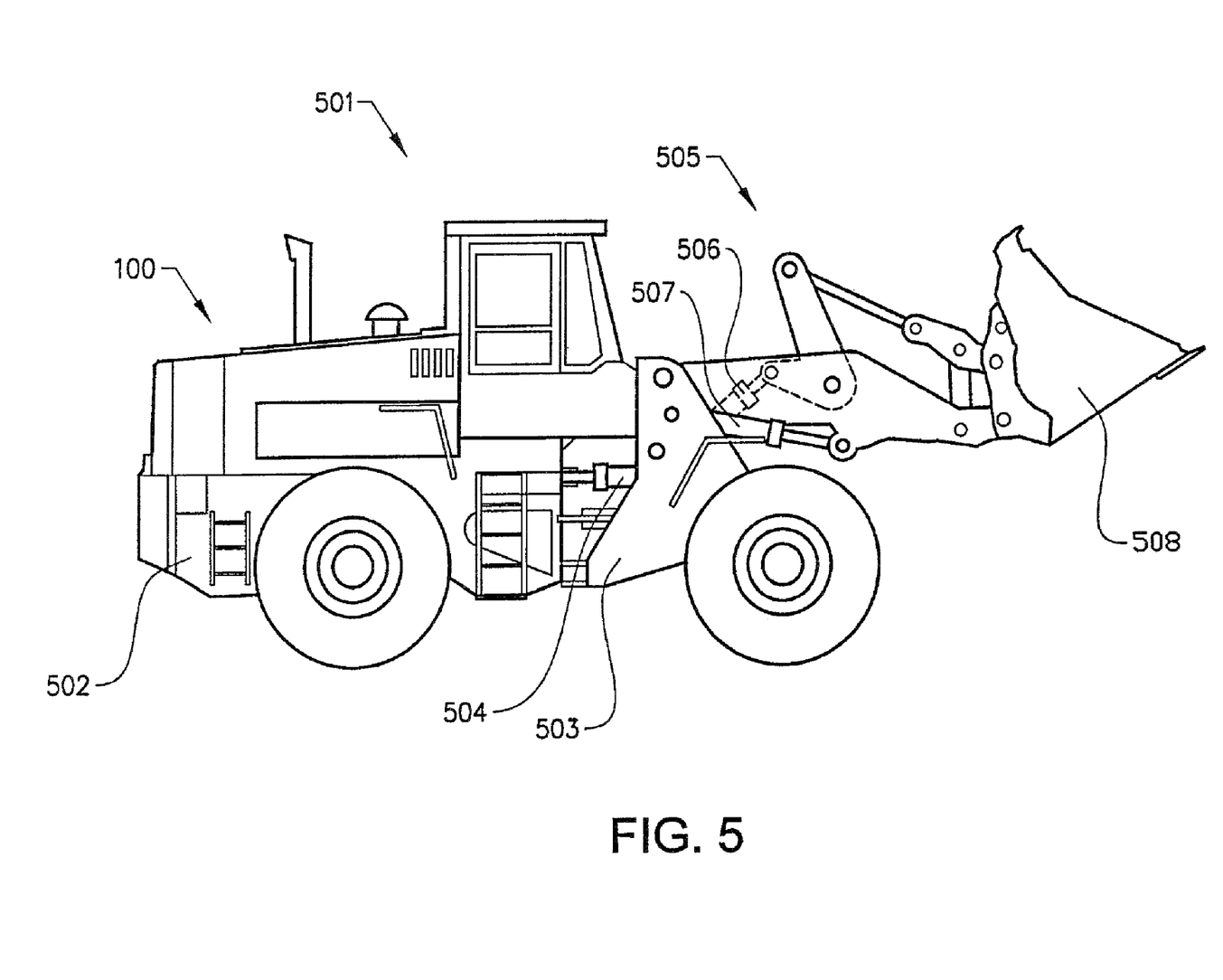
FIG. 5 shows a side view of a wheel-mounted loader comprising the system.

FIG. 5 shows a wheel-mounted loader 501 comprising the system 100. The motor 114 here comprises of the driving engine of the wheel-mounted loader 501. The wheel-mounted loader 501 comprises a front part 503 and a rear part 502, which parts each have at least one wheel axle. The vehicle parts are connected to one another in an articulated manner and the parts can be rotated relative to one another about hinges via two hydraulic cylinders 504 arranged between the two parts.

The main circuit described above in conjunction with FIG. 4 can be designed to provide the control cylinders 504 with hydraulic oil. The wheel-mounted loader 501 also comprises a connecting arm assembly 505 for handling a bucket 508. The connecting arm assembly 505 in turn comprises a number of hydraulic cylinders 505,506 for lifting and tilting the bucket. Said main circuit can also be designed to provide these hydraulic cylinders of the connecting arm assembly with hydraulic oil.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention is not to be regarded as being limited to the above-described illustrative embodiments, and instead a number of other variants and modifications are conceivable within the field of the attached patent claims.

FIG. 1 shows a basic hydraulic system to which the invention can be applied:
100 Hydraulic circuit;
110 Hydraulic pump system, controllable, expediently with variable displacement;
112 Pump;
114 Motor for pump;
120 Valve with cavitation-preventing opening;
122 Open position for coupling-in of load;
124 Closed position for uncoupling of load, comprising a cavitation-preventing opening;
126 Valve control;
130 Load, for example a fan;
150 Hydraulic fluid;
160 Tank/reservoir for hydraulic fluid;
162 Hydraulic fluid delivery from reservoir to pump;
164 Hydraulic fluid delivery from pump to valve;
166 Hydraulic fluid delivery from valve to load;
168 Hydraulic fluid delivery from pump to reservoir;
190 Temperature measurement of hydraulic fluid.

FIG. 2 shows a basic method according to the invention to be applied, for example, to a hydraulic system according to FIG. 1:
210 From start, or from a second step in the case where the temperature of the hydraulic fluid is not too low: a first step involves temperature measurement of the hydraulic fluid;
220 From the first step: the second step in which it is determined whether the temperature of the hydraulic fluid is too low;
230 From the second step if the temperature of the hydraulic fluid is too low, or from a fourth step if the valve is in such a position that the load is coupled in: a third step in which the position of the valve is determined;
240 From the third step: the fourth step which determines if the load is coupled in or uncoupled;
250 From the fourth step if the load is uncoupled: a fifth step in which the pressure in the hydraulic circuit is raised in order to create a pressure drop, through the existing cavitation-preventing opening in the valve, in order thereby to effect a power drain which heats the hydraulic fluid.

FIG. 3 shows an extended method according to the invention:
310 From start, or from a second step if the temperature of the hydraulic fluid is not too low: a first step involves temperature measurement of the hydraulic fluid;
320 From the first step: the second step in which it is determined whether the temperature of the hydraulic fluid is too low;
330 From the second step if the temperature of the hydraulic fluid is too low, or from a second extra step if a desired power drain of the load is not possible to collect via the cavitation-preventing opening: a third step in which the position of the valve is determined;
340 From the third step: the fourth step which determines if the load is coupled in or uncoupled;
341 From the fourth step if the valve is in such a position that the load is coupled: a first extra step in which the desired power drain of the load is determined;
342 From the first extra step: the second extra step which determines whether an increased pressure can produce the load's desired power drain or a lesser but still acceptable power drain for the load by raising the pressure and the flow thus obtained through the cavitation-preventing opening;
343 From the second extra step if the desired power drain of the load or a lesser but still acceptable power drain for the load can be achieved by raising the pressure and the thus resulting flow through the cavitation-preventing opening: a third extra step in which the valve for the load is controlled such that the load is uncoupled, and the cavitation-preventing opening is coupled in;
344 From the third extra step: a fourth extra step in which the pressure in the hydraulic circuit is increased so that the desired power drain of the load or the acceptable power drain is achieved, at the same time creating a pressure drop in order to obtain a power drain which heats the hydraulic fluid;
350 From the fourth step if the load is uncoupled: a fifth step in which the pressure in the hydraulic circuit is raised in order to create a pressure drop through the existing cavitation-preventing opening in the valve, in order thereby to effect a power drain which heats the hydraulic fluid.

FIG. 4 shows a typical hydraulic system with main circuit and auxiliary circuit to which the invention can suitably be applied:
410 Hydraulic pump system for auxiliary circuit, controllable, expediently with variable displacement;
419 Hydraulic pump system for main circuit, controllable, expediently with variable displacement;
420 Valve in auxiliary circuit with cavitation-preventing opening;
430 Load in auxiliary circuit, for example a fan;
450 Hydraulic fluid;
460 Common tank/reservoir for hydraulic fluid;
470 Pressure-controlled valve for coupling together main circuit and auxiliary circuit for high-priority load, does not work the operating hydraulics as supplied from auxiliary circuit;
482 Supply line to high-priority load, for example brake load;
484 Supply line to the operating hydraulics;
486 Supply return line from operating hydraulics to reservoir;
490 Temperature measurement of hydraulic fluid.

What is claimed is:

1. Method for controlling the viscosity of a hydraulic fluid, in which the hydraulic fluid is at least in part included in a hydraulic circuit comprising a pump, a first load, and a valve having a coupled position for coupling the first load to the pump and an uncoupled position for uncoupling the first load from the pump, the valve being arranged in series with the first load, the valve comprising, in the uncoupled position, a cavitation-preventing opening to the first load, the method comprising:

increasing a temperature of the hydraulic fluid by:
determining the temperature of the hydraulic fluid,
determining a status of the valve, and
increasing a pressure of the hydraulic circuit when the valve is in the uncoupled position and the temperature of the hydraulic fluid is lower than a predetermined temperature by controlling the pump such that a temperature-increasing pressure drop is created in the cavitation-preventing opening in the valve and so that the temperature of the hydraulic fluid is raised to the predetermined temperature primarily due to the temperature-increasing pressure drop.

2. Method according to claim 1, comprising increasing the pressure until a predetermined pressure is obtained in the hydraulic circuit.

3. Method according to claim 1, comprising maintaining the increased pressure for a predetermined length of time.

4. Method according to claim 1, comprising maintaining increased pressure for a sufficient length of time until a difference between the predetermined temperature and the temperature of the hydraulic fluid is less than or equal to a predetermined value.

5. Method according to claim 1, comprising interrupting viscosity control according to the method when it is desired to obtain a power drain in the first load.

6. Method according to claim 1, wherein the hydraulic circuit is an auxiliary circuit and the first load is a fan.

7. The method according to claim 1, wherein the pump is a controllable first load-sensing pump with variable displacement.

8. The method as set forth in claim 1, wherein the pressure is increased in response to the determined temperature and the determined status of the valve.

9. Method for controlling the viscosity of a hydraulic fluid, in which the hydraulic fluid is at least in part included in a hydraulic circuit comprising a pump, a first load, and a valve for coupling the first load to the pump and uncoupling the first load from the pump, the valve being arranged in series with the first load, the valve comprising, in the uncoupled position, a cavitation-preventing opening to the first load, the method comprising:
  increasing a temperature of the hydraulic fluid by:
    determining the temperature of the hydraulic fluid,
    determining a status of the valve, and
    increasing a pressure of the hydraulic circuit when the valve status is such that the first load is uncoupled and the temperature of the hydraulic fluid is lower than a predetermined temperature such that a temperature-increasing pressure drop is created in the cavitation-preventing opening in the valve, and
  after determination that the valve status is such that the first load is coupled in and the temperature of the hydraulic fluid is lower than a predetermined temperature, determining whether at least one of the first load's power drain or a lesser power drain can be taken from the flow which is obtained from the cavitation-preventing opening in combination with a higher pressure in the hydraulic circuit, and if it is determined that the first load's power drain or the lesser power drain can be taken, uncoupling the first load and increasing pressure in the hydraulic circuit to a necessary value for the first load to be able to take its power drain or the acceptable lesser power drain in combination with the pressure drop creating heating of the hydraulic fluid.

10. Method for controlling the viscosity of a hydraulic fluid, in which the hydraulic fluid is at least in part included in a hydraulic circuit comprising a pump, a first load, and a valve for coupling the first load to the pump and uncoupling the first load from the pump, the valve being arranged in series with the first load, the valve comprising, in the uncoupled position, a cavitation-preventing opening to the first load, the method comprising:
  increasing a temperature of the hydraulic fluid by:
    determining the temperature of the hydraulic fluid,
    determining a status of the valve, and
    increasing a pressure of the hydraulic circuit when the valve status is such that the first load is uncoupled and the temperature of the hydraulic fluid is lower than a predetermined temperature such that a temperature-increasing pressure drop is created in the cavitation-preventing opening in the valve, and
  wherein the hydraulic circuit comprises a second load, comprising coupling-in the second load such that pressure in the hydraulic circuit is increased to a predetermined value and the first load is uncoupled, wherein a duration of the coupling-in of the second load is a length of time which is of the order of a power of ten shorter than a shortest length of time during which an increased pressure exists in the hydraulic circuit for viscosity control.

11. Method for controlling the viscosity of a hydraulic fluid, in which the hydraulic fluid is at least in part included in a hydraulic circuit comprising a pump, a first load, and a valve for coupling the first load to the pump and uncoupling the first load from the pump, the valve being arranged in series with the first load, the valve comprising, in the uncoupled position, a cavitation-preventing opening to the first load, the method comprising:
  increasing a temperature of the hydraulic fluid by:
    determining the temperature of the hydraulic fluid,
    determining a status of the valve, and
    increasing a pressure of the hydraulic circuit when the valve status is such that the first load is uncoupled and the temperature of the hydraulic fluid is lower than a predetermined temperature such that a temperature-increasing pressure drop is created in the cavitation-preventing opening in the valve, and
  increasing the pressure until an increased pressure is obtained which is a function of a difference between the predetermined temperature and the temperature of the hydraulic fluid such that the greater the temperature difference, the higher the increased pressure.

12. Method for controlling the viscosity of a hydraulic fluid, in which the hydraulic fluid is at least in part included in a hydraulic circuit comprising a pump, a first load, and a valve for coupling the first load to the pump and uncoupling the first load from the pump, the valve being arranged in series with the first load, the valve comprising, in the uncoupled position, a cavitation-preventing opening to the first load, the method comprising:
  increasing a temperature of the hydraulic fluid by:
    determining the temperature of the hydraulic fluid,
    determining a status of the valve, and
    increasing a pressure of the hydraulic circuit when the valve status is such that the first load is uncoupled and the temperature of the hydraulic fluid is lower than a predetermined temperature such that a temperature-increasing pressure drop is created in the cavitation-preventing opening in the valve, and
  increasing the pressure until a predetermined power drain is obtained in the form of heating of the hydraulic fluid via the pressure drop in the cavitation-preventing opening.

13. A viscosity-controlling system for controlling the viscosity of a hydraulic fluid, the system comprising:
  a hydraulic circuit having a pump,
  a first load, and a valve having a coupled position for coupling the first load to the pump and an uncoupled position for uncoupling the first load from the pump, hydraulic fluid being included in the hydraulic circuit, a control unit which controls the valve and the pump, the valve being arranged in series with the first load, the valve comprising, in the uncoupled position, a cavitation-preventing opening to the first load, the system being adapted to control viscosity of the hydraulic fluid by increasing a temperature of the hydraulic fluid by the control unit being arranged to, in response to the temperature of the hydraulic fluid and a status of the valve, increase a pressure of the hydraulic circuit by controlling the pump when the valve is in the uncoupled position and the temperature of the hydraulic fluid is lower than a predetermined temperature such that a temperature-increasing pressure drop is created in the cavitation-preventing opening in the valve and so that the temperature of the hydraulic fluid is raised to the predetermined temperature primarily due to the temperature-increasing pressure drop.

14. The System according to claim 13, wherein the control unit is arranged to control the pump so that pressure is increased until a predetermined pressure is obtained in the hydraulic circuit.

15. The System according to claim 13, wherein the control unit is arranged to control the pump so that increased pressure is maintained for a predetermined length of time.

16. The System according to claim 13, wherein the control unit is arranged to control the pump such that increased pressure is maintained for sufficient a length of time such that a difference between the predetermined temperature and the temperature of the hydraulic fluid is less than or equal to a predetermined value.

17. The System according to claim 13, wherein the control unit is arranged to interrupt the viscosity control system when it is desired to obtain a power drain in the first load.

18. The System according to claim 13, wherein the hydraulic circuit is an auxiliary circuit and the first load is a fan.

19. The System according to claim 13, wherein the pump is a controllable first load-sensing pump with variable displacement.

20. Work vehicle comprising a system according to claim 13.

21. Method for controlling the viscosity of a hydraulic fluid, in which the hydraulic fluid is at least in part included in a hydraulic circuit comprising a pump, a first load, and a valve for coupling the first load to the pump and uncoupling the first load from the pump, the valve being arranged in series with the first load, the valve comprising, in the uncoupled position, a cavitation-preventing opening to the first load, the method comprising:

increasing a temperature of the hydraulic fluid by:
determining the temperature of the hydraulic fluid,
determining a status of the valve, and
increasing a pressure of the hydraulic circuit when the valve status is such that the first load is uncoupled and the temperature of the hydraulic fluid is lower than a predetermined temperature such that a temperature-increasing pressure drop is created in the cavitation-preventing opening in the valve, and
wherein, after determination that the valve status is such that the first load is coupled in and the temperature of the hydraulic fluid is lower than the predetermined temperature, uncoupling the first load and making a new determination of the valve status.

22. A viscosity-controlling system for controlling the viscosity of a hydraulic fluid, the system comprising:

a hydraulic circuit having a pump,
a first load, and
a valve for coupling the first load to the pump and uncoupling the first load from the pump,
hydraulic fluid being included in the hydraulic circuit,
a control unit which controls the valve and the pump,
the valve being arranged in series with the first load, the valve comprising, in an uncoupled position, a cavitation-preventing opening to the first load,
the system being adapted to control viscosity of the hydraulic fluid by increasing a temperature of the hydraulic fluid by the control unit, in response to the temperature of the hydraulic fluid and a status of the valve, increasing a pressure of the hydraulic circuit by controlling the pump when the valve status is such that the first load is uncoupled and the temperature of the hydraulic fluid is lower than a predetermined temperature such that a temperature-increasing pressure drop is created in the cavitation-preventing opening in the valve, wherein the control unit is arranged to control the pump so that pressure is increased until an increased pressure is obtained which is a function of a difference between the predetermined temperature and the temperature of the hydraulic fluid such that the greater the temperature difference, the higher the increased pressure.

23. A viscosity-controlling system for controlling the viscosity of a hydraulic fluid, the system comprising:

a hydraulic circuit having a pump,
a first load, and
a valve for coupling the first load to the pump and uncoupling the first load from the pump,
hydraulic fluid being included in the hydraulic circuit,
a control unit which controls the valve and the pump,
the valve being arranged in series with the first load, the valve comprising, in an uncoupled position, a cavitation-preventing opening to the first load,
the system being adapted to control viscosity of the hydraulic fluid by increasing a temperature of the hydraulic fluid by the control unit, in response to the temperature of the hydraulic fluid and a status of the valve, increasing a pressure of the hydraulic circuit by controlling the pump when the valve status is such that the first load is uncoupled and the temperature of the hydraulic fluid is lower than a predetermined temperature such that a temperature-increasing pressure drop is created in the cavitation-preventing opening in the valve, wherein the control unit is arranged to control the pump so that pressure is increased until a predetermined power drain is obtained in the form of heating of the hydraulic fluid via the pressure drop in the cavitation-preventing opening.

24. A viscosity-controlling system for controlling the viscosity of a hydraulic fluid, the system comprising:

a hydraulic circuit having a pump,
a first load, and
a valve for coupling the first load to the pump and uncoupling the first load from the pump,
hydraulic fluid being included in the hydraulic circuit,
a control unit which controls the valve and the pump,
the valve being arranged in series with the first load, the valve comprising, in an uncoupled position, a cavitation-preventing opening to the first load,
the system being adapted to control viscosity of the hydraulic fluid by increasing a temperature of the hydraulic fluid by the control unit, in response to the temperature of the hydraulic fluid and a status of the valve, increasing a pressure of the hydraulic circuit by controlling the pump when the valve status is such that the first load is uncoupled and the temperature of the hydraulic fluid is lower than a predetermined temperature such that a temperature-increasing pressure drop is created in the cavitation-preventing opening in the valve, wherein, when the valve status is such that the first load is coupled in and the temperature of the hydraulic fluid is lower than the predetermined temperature, the control unit is further arranged to uncouple the first load and determine the valve status again.

25. A viscosity-controlling system for controlling the viscosity of a hydraulic fluid, the system comprising:
a hydraulic circuit having a pump,
a first load, and
a valve for coupling the first load to the pump and uncoupling the first load from the pump,
hydraulic fluid being included in the hydraulic circuit,
a control unit which controls the valve and the pump,
the valve being arranged in series with the first load, the valve comprising, in an uncoupled position, a cavitation-preventing opening to the first load,
the system being adapted to control viscosity of the hydraulic fluid by increasing a temperature of the hydraulic fluid by the control unit, in response to the temperature of the hydraulic fluid and a status of the valve, increasing a pressure of the hydraulic circuit by controlling the pump when the valve status is such that the first load is uncoupled and the temperature of the hydraulic fluid is lower than a predetermined temperature such that a temperature-increasing pressure drop is created in the cavitation-preventing opening in the valve, wherein, when the valve status is such that the first load is coupled in and the temperature of the hydraulic fluid is lower than the predetermined temperature, the control unit is arranged to determine whether at least one of the first load's power drain and an acceptable lesser power drain can be taken from the flow which is obtained from the cavitation-preventing aperture in combination with a higher pressure in the hydraulic circuit, and, when it is determined that the first load's power drain or the acceptable lesser power drain can be taken, the control unit is arranged to uncouple the first load and increase pressure in the hydraulic circuit to a value necessary for the first load to be able to take out its power drain or the acceptable lesser power drain in combination with the pressure drop creating heating of the hydraulic fluid.

26. A viscosity-controlling system for controlling the viscosity of a hydraulic fluid, the system comprising:
a hydraulic circuit having a pump,
a first load, and
a valve for coupling the first load to the pump and uncoupling the first load from the pump,
hydraulic fluid being included in the hydraulic circuit,
a control unit which controls the valve and the pump,
the valve being arranged in series with the first load, the valve comprising, in an uncoupled position, a cavitation-preventing opening to the first load,
the system being adapted to control viscosity of the hydraulic fluid by increasing a temperature of the hydraulic fluid by the control unit, in response to the temperature of the hydraulic fluid and a status of the valve, increasing a pressure of the hydraulic circuit by controlling the pump when the valve status is such that the first load is uncoupled and the temperature of the hydraulic fluid is lower than a predetermined temperature such that a temperature-increasing pressure drop is created in the cavitation-preventing opening in the valve, wherein the hydraulic circuit comprises a second load and, upon coupling of the second load, during a length of time which is of the order of a power of ten shorter than a shortest length of time during which the control unit is arranged to maintain a pressure increase in the hydraulic circuit for viscosity control, the control unit is arranged to control the pump so that pressure in the hydraulic circuit increases to a predetermined value and the control unit is arranged to uncouple the first load.

* * * * *